Patented Nov. 2, 1948

2,452,595

UNITED STATES PATENT OFFICE 2,452,595

N(ETHYL MERCURY) PARA-TOLUENE SULFONANILIDE AND METHOD OF MAKING SAME

Dwight F. Mowery, Jr., Springfield, Mass., assignor to E. I. du Pont de Nemours & Company, Wilmington, Del., a corporation of Delaware No Drawing. Application March 8, 1945, Serial No. 581,721

2 Claims. (Cl. 260—433)

This invention relates to methods and compositions and has for its objects to provide new organic mercury compounds, to provide new and improved methods of making new organic mercury compounds, to provide new compounds which are highly stable and relatively nonvesicant, to provide processes in which an organic mercury sulfonamide relatively free of lead contamination may be prepared from a tetraorganic lead compound, to provide such processes which are economical and efficient to overcome the disadvantages of the prior art and to obtain advantages as are being pointed out. Further objects will become apparent as the description proceeds.

These objects are accomplished in the present invention by the methods and compositions more particularly to be set out and as illustrated in the following examples in which the parts are by weight unless otherwise specified.

*Example 1*

To a solution of 2 parts of soda ash in 300 parts of cold water (20° C.) are added, successively, 40 parts of p-toluene sulfon chloride, 40.2 parts of aniline, 41.2 parts of p-toluene sulfon chloride, and 23.2 parts of soda ash. The charge is heated to 80–90° C. for one hour to complete the reaction and then cooled to about 25° C. p-Toluene sulfonanilide precipitates in the form of coarse crystals which are filtered, washed soda ash-free and used for the preparation of ethyl mercury-p-toluene sulfonanilide without drying.

100 parts of 100% p-toluene sulfonanilide are obtained, having a melting range of 100–103° C.

47.4 parts of mercuric oxide are dissolved in 62.2 parts of glacial acetic acid at 90–95° C. and 29.6 parts of tetraethyl lead are added over a period of 1–2 hours at the same temperature. A solution of ethyl mercuric acetate is obtained (solution A).

59.4 parts of 100% p-toluene sulfonanilide (as press cake) are dissolved at 60–65° C. in 64 parts of water containing 32 parts of 30% sodium hydroxide (solution B).

130 parts of 30% sodium hydroxide are added to 500 parts of crushed ice which causes the temperature to drop to about —18° C. Solution A which has been cooled to 20–30° C is added in 1–2 hours to the well-agitated slurry of ice. The resulting reaction mass now contains ethyl mercuric hydroxide and a water soluble salt of lead. Solution B which has been cooled to 20–30° C. is added over a period of 1–2 hours. Ethyl mercury-p-toluene sulfonanilide precipitates in a microcrystalline form as the addition of solution B proceeds. The temperature of the reaction mass rises to about —5 to 0° C. The precipitate is filtered, washed free of caustic with cold water (10–30° C.), and dried at 60° C. under reduced pressure or in a current of air.

100 parts of 100% ethyl mercury-p-toluene sulfonanilide are obtained. This crude product is 95–97% pure based on the mercury content. It has a crystallizing point of 149.4° C. and can be melted to a practically colorless liquid without apparent decomposition. It is insoluble in cold water and does not give off volatile mercury compounds when treated with steam. It is stable in boiling water and can be recovered unchanged even after boiling for several hours.

Ethyl mercury-p-toluene sulfonanilide can be purified by crystallizing it from about 12 parts of ethyl alcohol. It is then obtained in the form of colorless coarse needles melting at 156° C.

The crude product as obtained from the reaction mass may contain up to 2.5% of lead, indicating that at least 85% of the lead introduced in the course of the reaction has been removed in the filtrate and the subsequent washes.

The crude ethyl mercury-p-toluene sulfonanilide may be milled with inert diluents such as talc and a coloring agent to give any desired mercury concentration. For such purposes, the dry product or the wet filter cake may be used with equal success.

Ethyl mercury hydroxide made by any method known to the art may be used for the condensation. For instance, salts of ethyl mercury hydroxide such as the chloride, nitrate, formate and propionate may be used in place of ethyl mercury acetate.

If the condensation temperature of ethyl mercury hydroxide and p-toluene sulfonanilide lies between —20° C. and +30° C., an ethyl mercury-p-toluene sulfonanilide is obtained in a microcrystalline form, which is very desirable for standardizing purposes. However, the reaction also proceeds at temperatures higher than 30° C.

The formula of N(ethyl mercury)-p-toluene sulfonanilide is

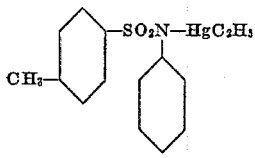

Example 2

To 300 parts of aqueous solution containing 49.6 parts of monomethylamine there is slowly added with agitation 120 parts of beta naphthalene sulfon chloride over a period of three hours while keeping the temperature at 35° C. Agitation is continued for three more hours while keeping the temperature at 35° C. overnight at room temperature. There is obtained 93.5 parts of N-methyl betanaphthalene sulfonamide. 38.9 parts of this compound is dissolved in 400-volume parts of ethyl alcohol (2–B grade) and heated at reflux with good agitation. 850 volume-parts of ethyl mercury hydroxide solution prepared as in Example 1 is added over three hours and reflux continued for two hours longer. After cooling in an ice bath and filtering there are obtained 74 parts of white needles which melted at 119–21° C. after two crystallizations from ethyl alcohol.

The formula is

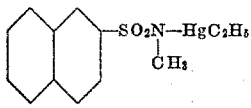

Example 3

To 280 parts of aniline suspended in 3000-volume parts of water containing 300 parts of sodium hydroxide there is added slowly with good agitation 900 parts of betanaphthalene sulfone chloride over two to three hours. The mixture is then heated at 50° C. with agitation for fifteen hours and neutralized with HCl with cooling and agitation. The precipitate is filtered off and washed with water until free of chlorine by the silver nitrate test. The product recrystallized from ethyl alcohol melted at 131–33° C.

49.8 parts of this product is dissolved in 400 cc. of ethyl alcohol (2–B grade) and heated at reflux with good agitation. 850-volume parts of ethyl mercury hydroxide solution prepared as in Example 1 is then added over three hours and reflux continued for two hours longer. After cooling in ice 82 parts of crystals were filtered off which melted at 169–171° C. after two crystalizations from ethyl alcohol.

The formula is

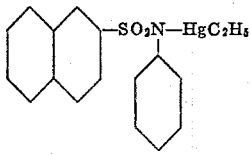

Example 4

To 439 parts of aniline suspended in 1700-volume parts of distilled water and 1000-volume parts of 30% NaOH is added slowly with good agitation 840-volume parts of mixed xylene sulfone chloride over about two hours. The reaction is then heated at 50° C. with agitation for seventeen hours until complete solution of all material is obtained. The solution is then treated with activated carbon, filtered, and acidified with HCl slowly until just acid to Congo red paper. The precipitate is filtered and washed, and recrystallized from ethyl alcohol (2-B grade). The product thus obtained melted at 147–59° C.

To 39.2 grams of this material in 150-volume parts of ethyl alcohol is added with agitation at reflux an ethyl alcohol solution of 37 parts of ethyl mercury hydroxide in 760-volume parts of solution over about one and one half hours. Reflux is continued for about three hours and the solution allowed to cool overnight at room temperature and then cooled in ice, filtered and twice recrystallized from ethyl alcohol. The product has a melting point of 69–71° C.

The formula is

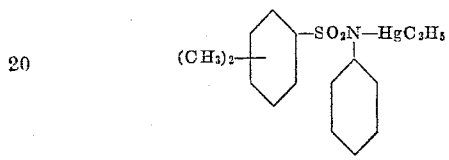

The mixed xylene sulfone chloride utilized in this example is prepared as follows: 3770 parts of chlorosulfonic acid is cooled in a salt-ice mixture to −5° C. 1000 parts of crude xylene is added over about six hours with agitation while keeping the temperature below 0° C. The mixture is kept iced overnight at 0–5° C. and is then run into ice with good agitation. The oil thus obtained is allowed to settle and is washed three times with water.

The ethyl mercury hydroxide solution is obtained as follows:

560 parts of silver nitrate (2.2 moles per mole of ethyl mercury chloride) were dissolved in 6000 parts of water and treated with 3.5 moles of sodium hydroxide dissolved in 2000 parts of water. The resulting silver oxide was filtered, washed caustic-free and suspended in about 1000 parts of ethyl alcohol.

400 parts of ethyl mercury chloride was heated to reflux in about 3000 parts of ethyl alcohol and the suspension of the silver oxide was added at the boil over a period of about 4 hours. The solution was cooled and filtered from the precipitated silver chloride and unreacted silver oxide. 4700 volume parts of solution of ethyl mercury hydroxide was obtained.

The processes of the invention are particularly adapted to making alkyl mercury derivatives of N-substituted aromatic sulfonamides which, as will be pointed out, are particularly of interest as new compounds in view of their unique properties, but are not limited to making these compounds but may be utilized for converting tetraorganic lead, whether tetraethyl lead or tetraphenyl lead, or other tetraalkyl and tetraaryl lead compounds.

The processes of the invention are particularly characterized in that the tetraorganic lead compound and an acid, the corresponding lead salt of which is water soluble, is caused to act upon mercuric oxide at a reactive temperature and the resulting product in turn caused to act upon a sulfonamide in aqueous alkali at a reactive temperature with the result that the product of the reaction is N-organic mercury sulfonamide, relatively insoluble in water, whereas the by-product lead compounds are relatively soluble. Thus an N-organic mercury sulfonamide may be obtained by the processes of the invention substantially free of contamination with lead without being necessary to specifically prepare an intermediate organic mercury hydroxide free of lead.

The N-alkyl mercury derivatives of N-substituted aromatic sulfonamides which may be prepared in accordance with the preferred processes of the invention are particularly useful as fungicides or a control of seed-borne diseases. Alkyl salts of inorganic and organic acids and acidic nitrogen compounds such as the sulfonamides are known to be useful for the control of seed-borne diseases disclosed, for example, in U. S. Patents 1,987,685, 2,119,701, and 2,273,443. The compounds of the invention which are characterized in that all three valences of the nitrogen are substituted are especially useful in the control of seed-borne diseases because of their relatively smaller tendency to decompose to the relatively vesicant and volatile dialkyl and dialkyloxy mercury and other consequent lessened tendency to cause skin irritation.

It is believed that this unique characteristic of the N-alkyl mercury derivatives of N-substituted aromatic sulfonamides is due to the highly acidic nature of the sulfonamide coupled with the lack of replaceable hydrogen on the nitrogen. In any event, those sulfonamides which contain strongly negative groups attached to the nitrogen, as in the case of para-toluene sulfonamide which contains the unsaturated and highly negative benzene radical directly attached to the nitrogen, exhibit the desirable characteristics of the invention to the highest degree. Thus the N-alkyl mercury derivatives of N-aryl aromatic sulfonamides are of particular value in accordance with the invention for the treatment of seed-borne diseases.

It will be understood that the compound of the invention may be prepared by processes other than the processes of the invention, for example, processes such as are described in Patents 2,119,701 and 2,273,443, and may be utilized in the preparation of the compounds of the invention.

I am aware that N-alkyl mercury derivatives of naphsultamic acid are disclosed in Patent 2,273,443 and that the nitrogen of this compound is fully substituted. This compound, however, is characterized by a heterocyclic nitrogen-sulfur ring and is therefore entirely different from the compounds of my invention. In the preparation of naphsultamic acid, moreover, position isomers are obtained so that the yield based on the starting material, naphthylamine, is very low, the reason being that only the isomer in which the sulfonic group is in the one position will condense with the nitrogen to form naphsultamic acid. This disadvantage is not encountered with the compounds of the invention so that economies are effected by the present invention which make it economical to treat grain and other seeds for the control of seed-borne diseases.

While I have described my invention with reference to particular embodiments thereof it will be understood that variations may be made without departing from the spirit and scope of the invention.

I claim:

1. N(ethylmercury) para-toluene sulfonanilide.

2. In the manufacture of N(ethyl mercury) para-toluene sulfonanilide, the steps comprising reacting tetraethyl lead and acetic acid with mercuric oxide whereby a mixture of ethyl mercury acetate and lead acetate is formed, and thereafter admixing the mixture with para-toluene sulfonanilide in aqueous alkali and reacting the ethyl mercury acetate with the para-toluene sulfonanilide at a temperature between about $-20°$ C. and $+30°$ C.

DWIGHT F. MOWERY, Jr.

REFERENCES CITED

The following references are of record in the file of this patent:

UNITED STATES PATENTS

| Number | Name | Date |
|---|---|---|
| 1,987,685 | Kharasch | Jan. 15, 1935 |
| 2,119,701 | Callsen | June 7, 1938 |
| 2,135,553 | Anderson | Nov. 8, 1938 |
| 2,273,443 | Klos | Feb. 17, 1942 |

FOREIGN PATENTS

| Number | Country | Date |
|---|---|---|
| 111,230 | Austria | Aug. 22, 1940 |

OTHER REFERENCES

Chem. Abstracts, 1942, pp. 2849–2850.